United States Patent
Gean et al.

(10) Patent No.: US 9,667,284 B1
(45) Date of Patent: May 30, 2017

(54) METHOD, DEVICE, AND SYSTEM FOR IDENTIFYING A HOWLING SOURCE AND SUPPRESSING HOWLING

(71) Applicant: MOTOROLA SOLUTIONS, INC., Schaumburg, IL (US)

(72) Inventors: Nissim Gean, Netanya (IL); Pavel Livshits, Modiyin (IL); Shai Natanzon, Netanya (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/064,413

(22) Filed: Mar. 8, 2016

(51) Int. Cl.
| | |
|---|---|
| H04W 4/10 | (2009.01) |
| H04W 64/00 | (2009.01) |
| H04B 1/10 | (2006.01) |
| H04M 1/60 | (2006.01) |
| G01S 11/06 | (2006.01) |
| G01S 11/14 | (2006.01) |

(52) U.S. Cl.
CPC ............... *H04B 1/10* (2013.01); *G01S 11/06* (2013.01); *G01S 11/14* (2013.01); *H04M 1/605* (2013.01); *H04W 4/10* (2013.01)

(58) Field of Classification Search
CPC ......... H04W 4/00; H04W 4/10; H04W 64/00; H04M 1/72
See application file for complete search history.

(56) References Cited

U.S. PATENT DOCUMENTS

| | | | | |
|---|---|---|---|---|
| 6,741,874 | B1 * | 5/2004 | Novorita | H04M 9/082 370/282 |
| 6,952,471 | B1 * | 10/2005 | Cannon | H04M 1/72502 379/388.01 |
| 7,991,146 | B2 | 8/2011 | Beaucoup | |
| 8,027,640 | B2 | 9/2011 | Contreras et al. | |
| 8,072,640 | B2 * | 12/2011 | Yano | H04N 1/00278 348/207.2 |
| 8,630,426 | B2 | 1/2014 | Svendsen | |

(Continued)

FOREIGN PATENT DOCUMENTS

WO     2010080374     7/2010

*Primary Examiner* — Blane Jackson
(74) *Attorney, Agent, or Firm* — Michael Best & Friedrich LLP

(57) ABSTRACT

Method, device, and system for identifying a howling source and suppressing howling. One system includes a first communication device including a microphone, a first transceiver, and an electronic processor. The system also includes a second communication device including a second transceiver transmitting a radio signal and a speaker transmitting an acoustic signal. The electronic processor determines a first distance between the first communication device and the second communication device based on the radio signal received by the first transceiver. When the first distance is less than a first threshold, the electronic processor determines a second distance between the first communication device and the second communication device based on the acoustic signal received by the microphone. When the second distance is less than a second threshold, the electronic processor instructs at least one selected from the group consisting of the first communication device and the second communication device to suppress howling.

20 Claims, 8 Drawing Sheets

(56) References Cited

U.S. PATENT DOCUMENTS

| | | | | |
|---|---|---|---|---|
| 8,718,562 B2* | 5/2014 | Sorensen | ............ | H03G 3/3089 |
| | | | | 455/63.1 |
| 2006/0177045 A1* | 8/2006 | Thomas | ................ | H04M 3/567 |
| | | | | 379/399.01 |
| 2009/0215439 A1* | 8/2009 | Hamilton | .............. | H04M 1/605 |
| | | | | 455/418 |
| 2010/0151787 A1* | 6/2010 | Contreras | ................ | H04B 1/44 |
| | | | | 455/41.2 |
| 2011/0110532 A1* | 5/2011 | Svendsen | ............. | H04M 9/082 |
| | | | | 381/93 |
| 2012/0295562 A1* | 11/2012 | Sorensen | ............. | H03G 3/3089 |
| | | | | 455/127.2 |
| 2015/0119067 A1* | 4/2015 | Lavery | ................ | H04W 64/003 |
| | | | | 455/456.1 |
| 2016/0094960 A1* | 3/2016 | Wong | ..................... | H04W 4/10 |
| | | | | 370/277 |

* cited by examiner

METHOD, DEVICE, AND SYSTEM FOR IDENTIFYING A HOWLING SOURCE AND SUPPRESSING HOWLING

BACKGROUND OF THE INVENTION

Communication systems, such as half-duplex communication systems, may experience problems when a receiving communication device is in close proximity to a transmitting communication device. For example, a microphone of the transmitting communication device may receive a feedback signal generated by a speaker of the receiving communication device. The feedback signal may continue to circulate and grow in an unstable loop leading to a phenomenon known as howling. Detecting a distance between the transmitting communication device and the receiving communication may identify a howling situation. However, techniques to accurately measure a distance between communication devices often have performance tradeoffs with power consumption. For example, more accurate distance measurement techniques often use more power than less accurate distance measurement techniques.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
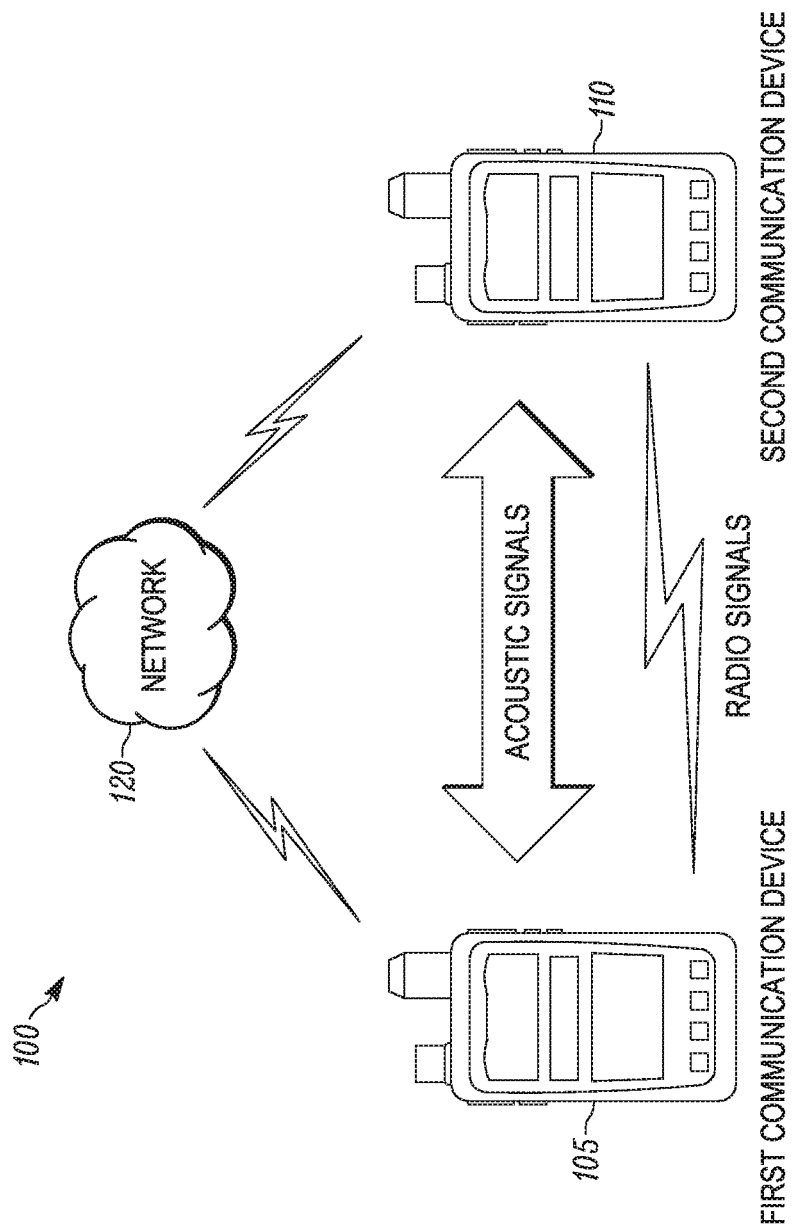
FIG. 1 is a block diagram of a communication system according to one embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a first communication device including a microphone, a radio transceiver, and an electronic processor. The electronic processor is configured to determine a first distance between the first communication device and a second communication device based on a radio signal received by the radio transceiver. When the first distance is less than a first threshold, the electronic processor is configured to determine a second distance between the first communication device and the second communication device based on an acoustic signal received by the microphone. When the second distance is less than a second threshold, the electronic processor is configured to identify one selected from the group consisting of the first communication device and the second communication device as a howling source and suppress howling associated with the howling source.

Another embodiment provides a method of identifying a howling source and suppressing howling. The method includes determining, with an electronic processor of a first communication device, a first distance between the first communication device and a second communication device based on a radio signal received by a radio transceiver of the first communication device. The method further includes, when the first distance is less than a first threshold, determining, with the electronic processor of the first communication device, a second distance between the first communication device and the second communication device based on an acoustic signal received by a microphone of the first communication device. The method also includes, when the second distance is less than a second threshold, identifying, with the electronic processor of the first communication device, the second communication device as a howling source for the first communication device, and suppressing howling associated with the second communication device.

Another embodiment provides a communication system including a first communication device including a microphone, a first transceiver, and an electronic processor. The communication system further includes a second communication device including a second transceiver transmitting a radio signal and a speaker transmitting an acoustic signal. The electronic processor determines a first distance between the first communication device and the second communication device based on the radio signal received by the first transceiver. Additionally, the electronic processor determines a second distance between the first communication device and the second communication device based on the acoustic signal received by the microphone. When the first distance is less than a first threshold and the second distance is less than a second threshold, the electronic processor instructs at least one selected from the group consisting of the first communication device and the second communication device to suppress howling.

Another embodiment provides a method of identifying a howling source and suppressing howling. The method includes determining, with an electronic processor, a coarse distance between a first communication device and a second communication device using a low power radio proximity detection technique. The method further includes, when the coarse distance is less than a first threshold, determining, with the electronic processor, a finer distance between the first communication device and the second communication device using a higher power acoustic proximity detection technique. The method further includes, when the finer distance is less than a second threshold, identifying, with the electronic processor, one selected from the group consisting of the first communication device and the second communication device as a howling source and suppressing howling associated with the howling source.

FIG. 1 is a block diagram of a communication system 100 according to one exemplary embodiment. The communication system 100 includes a first communication device 105 and a second communication device 110. The first communication device 105 and the second communication device 110 communicate over a network 120. The network 120 may be a wired or a wireless communication network, such as a cellular network, the Internet, a land mobile radio (LMR) network, a Bluetooth™ network, a wireless local area network (for example, Wi-Fi, direct Wi-Fi, or a combination thereof), a wireless accessory Personal Area Networks (PAN), a Machine-to-machine (M2M) autonomous network, a public switched telephone network, a future developed network, or any combination or derivative thereof. It should be understood that although only two communication devices are illustrated in FIG. 1, additional communication devices may be included in the communication system 100 and may communicate over the network 120.

As illustrated in FIG. 1, the first communication device 105 and the second communication device 110 may be handheld communication devices, such as mobile telephones, mobile radios, smart watches or other smart wearables, or other portable devices configured to communicate over the network 120. The first communication device 105, the second communication device 110, or both may alternatively be a mounted or stationary communication device, such as a landline telephone, a speakerphone, or a communication device installed in a vehicle. For example, in some embodiments, the first communication device 105 may be a handheld cellular telephone carried by public safety personnel, such as a police officer, and the second communication device 110 may be a cellular communication device installed in a public safety vehicle, such as a police vehicle. Accordingly, it should be understood that the first communication device 105 and the second communication device 110 may be any type of communication device capable of communicating over the network 120, and, in some embodiments, the first communication device 105 and the second communication device 110 may be different types of communication devices.

Figure 2:
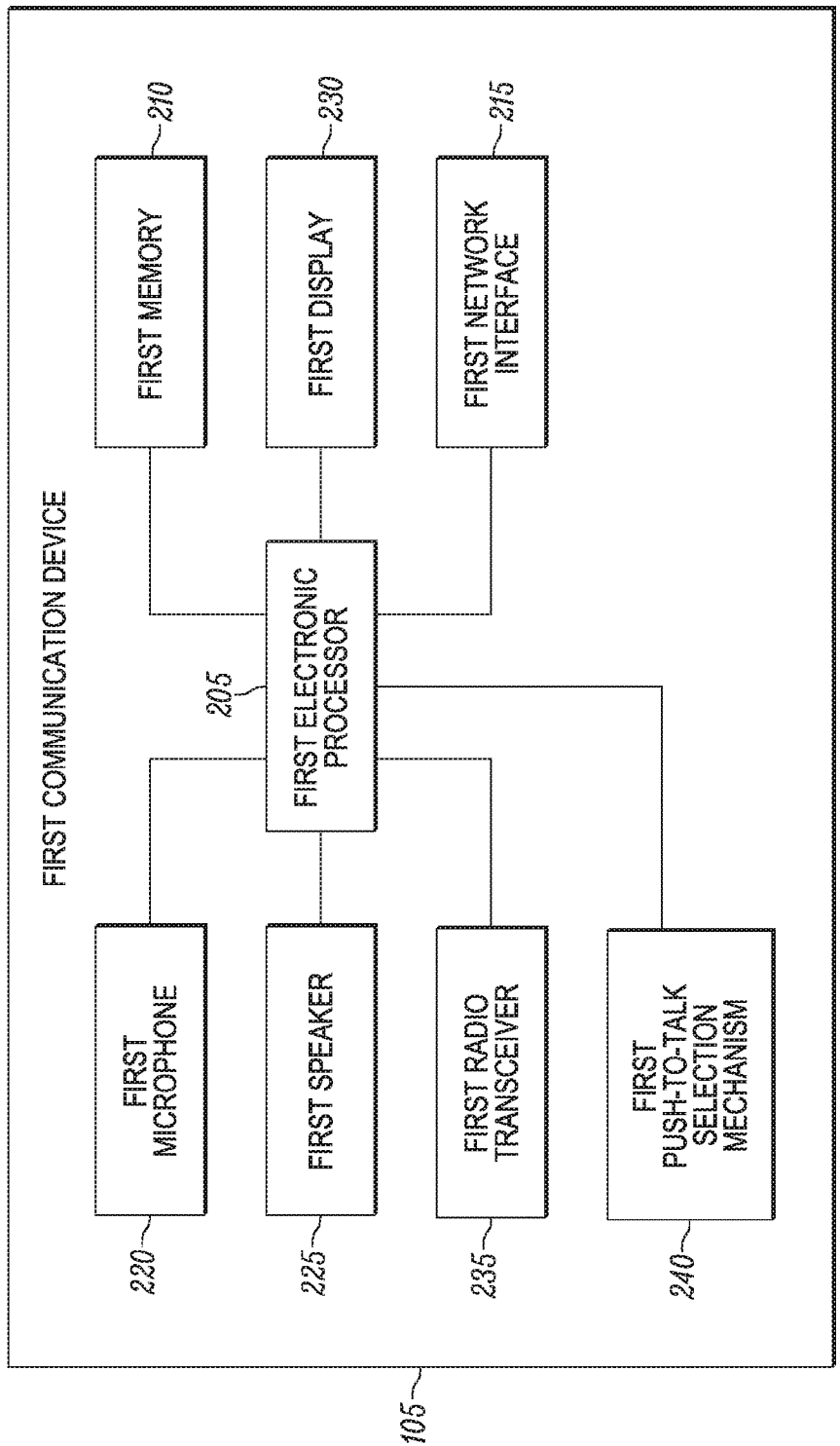
FIG. 2 is a block diagram of a first communication device included in the communication system of FIG. 1 according to one embodiment.

FIG. 2 is a block diagram of the first communication device 105 according to one embodiment. As illustrated in FIG. 2, the first communication device 105 includes a first electronic processor 205 (for example, a microprocessor, an application-specific integrated circuit (ASIC), or another electronic device), a first memory 210, a first network interface 215, a first microphone 220, a first speaker 225, a first display 230, and a first radio transceiver 235 that communicate over one or more wired or wireless connections or buses. In some embodiments, the first microphone 220 and the first speaker 225 support sub-ultrasonic frequencies. The first microphone 220 and the first speaker 225 may have main transducers that support sub-ultrasonic frequencies. Alternatively, in some embodiments, the first microphone 220 and the first speaker 225 may have additional transducers that are dedicated to support sub-ultrasonic frequencies. Furthermore, in some embodiments, the first communication device 105 also includes a first push-to-talk selection mechanism 240. It should be understood that, in some embodiments, the first communication device 105 may include fewer or additional components in configurations different from that illustrated in FIG. 2. For example, in some embodiments, the first communication device 105 includes multiple microphones, multiple speakers, or a combination thereof. Also the first communication device 105 may perform additional functionality than the functionality described below.

The first memory 210 includes read only memory (ROM), random access memory (RAM), flash memory, optical or magnetic disk storage, other non-transitory computer-readable medium, or a combination thereof. The first electronic processor 205 is configured to receive instructions and data from the first memory 210 and execute, among other things, the instructions. In particular, the first electronic processor 205 executes instructions stored in the first memory 210 to perform the methods described herein.

The first network interface 215 communicates with the network 120. For example, the first network interface 215 may include a transceiver for wirelessly communicating with the network 120. Alternatively or in addition, the first network interface 215 may include a connector or port for receiving a wired connection to the network 120, such as an Ethernet cable or telephone cable for communicating with a public switched telephone network.

The first communication device 105 communicates data over the network 120 through the first network interface 215. For example, the first electronic processor 205 may communicate sound data detected through the first microphone 220 over the network 120 through the first network interface 215, such as for receipt by the second communication device 110. Similarly, the first electronic processor 205 may output data received from the network 120 through the first network interface 215, such as from the second communication device 110, through the first speaker 225, the first display 230, or combination thereof.

In some embodiments, the optional first push-to-talk selection mechanism 240 allows a user of the first communication device 105 to initiate communication over the network 120. For example, when the first electronic processor 205 detects that the first push-to-talk selection mechanism 240 is enabled, the first electronic processor 205 communicates sound data detected by the first microphone 220 over the network 120 (for example, as a half-duplex communication signal). When the first electronic processor 205 detects that the first push-to-talk selection mechanism 240 is no longer enabled (for example, has been released), the first electronic processor 205 stops the communication of the sound data. It should be understood that the first push-to-talk selection mechanism 240 may be a mechanical button or knob or a virtual button or knob displayed on the first display 230, which may include a touchscreen.

As illustrated in FIG. 1, the first communication device 105 and the second communication device 110 may also communicate externally to the network 120. For example, as described in more detail below, the first communication device 105 and the second communication device 110 may communicate through radio signals and acoustic signals.

The first radio transceiver 235 transmits and receives radio signals. For example, in some embodiments, the first radio transceiver 235 includes a Bluetooth™ low energy (BLE) transceiver that transmits and receives low-power, short-distance radio signals (for example, beacons). In some embodiments, the Bluetooth™ low energy transceiver consumes less than approximately 0.5 Watts, has a peak current consumption of less than approximately 0.15 milliamps, and has a communication range of approximately twenty meters to 120 meters or any value therebetween. Accordingly, as used in the present application, the term "short-distance" may indicate a distance less than approximately 100 meters. Alternatively or in addition, the first radio transceiver 235 may include another type of device that transmits and receives radio signals. It should be understood that the above description of the first radio transceiver 235 is merely exemplary and that transceivers and signals with different properties may be used as the first radio transceiver 235 in some embodiments. Furthermore, it should be understood that the above ranges are merely exemplary and that, in some embodiments, the range of the first radio transceiver 235 may be greater than 120 meters or less than twenty meters. Also, in some embodiments, the functionality performed by the first radio transceiver 235 as described herein is performed by the first network interface 215. Therefore, in these embodiments, the first communication device 105 may not include the first radio transceiver 235 separate from the first network interface 215.

Figure 3:
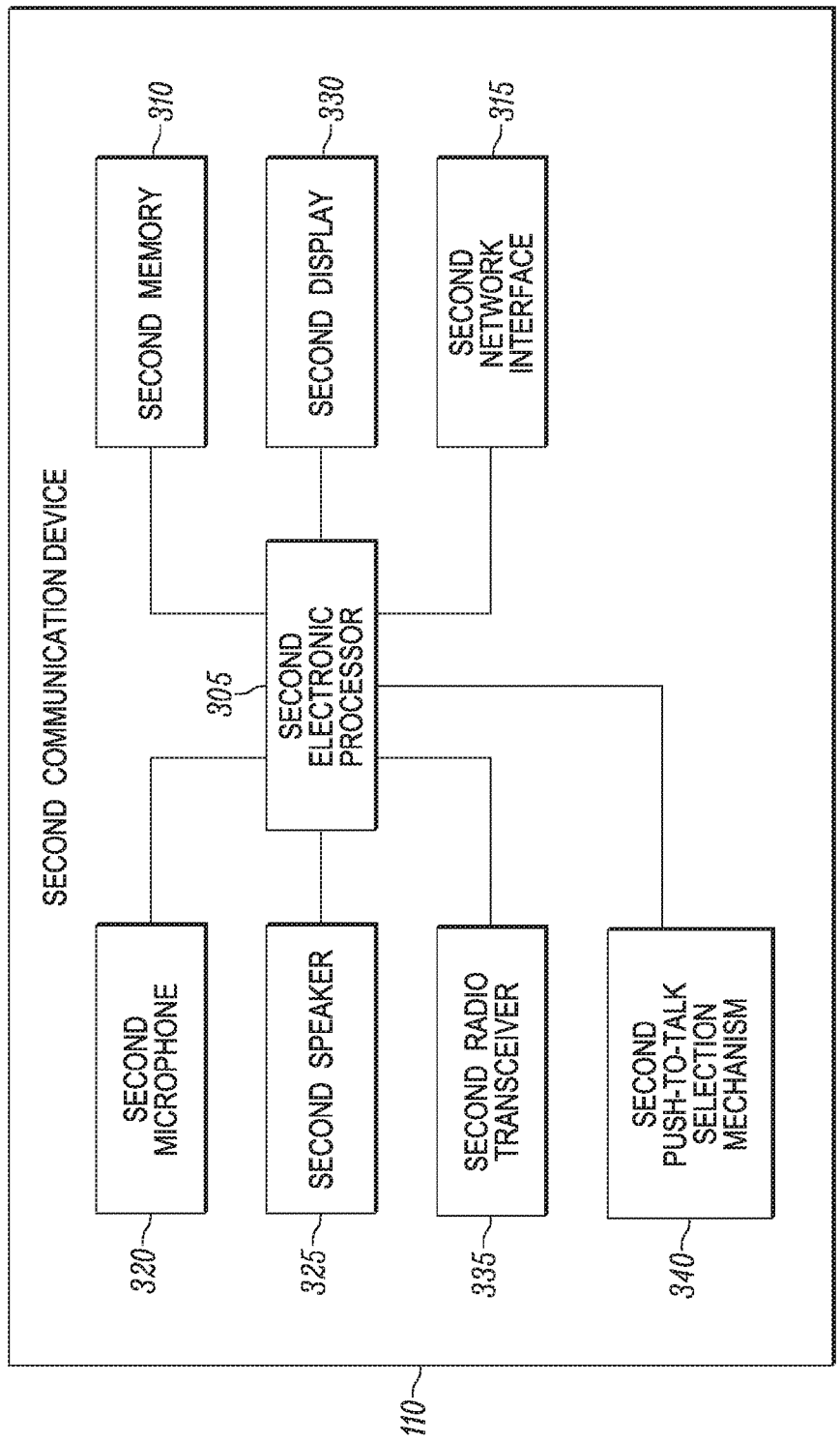
FIG. 3 is a block diagram of a second communication device included in the communication system of FIG. 1 according to one embodiment.

As illustrated in FIG. 3, in some embodiments, the second communication device 110 includes similar components as the first communication device 105 illustrated in FIG. 2. In particular, as illustrated in FIG. 3, in some embodiments, the second communication device 110 includes a second electronic processor 305, a second memory 310, a second network interface 315, a second microphone 320, a second speaker 325, a second display 330, a second radio transceiver 335, and (optionally) a second push-to-talk selection mechanism 340, which may be similar (in structure and function) to the first electronic processor 205, the first memory 210, the first network interface 215, the first microphone 220, the first speaker 225, the first display 230, the first radio transceiver 235, and the first push-to-talk selection mechanism 240 as described above with respect to the first communication device 105. It should be understood, however, that some embodiments of the second communication device 110 may include additional or different components then the first communication device 105.

As noted above, in some situations, when the first communication device 105 is in close proximity to the second communication device 110 and the first communication device 105 is transmitting data to the second communication device 110, the first microphone 220 of the first communication device 105 may receive a feedback signal from the second speaker 325 of the second communication device 110. The feedback signal may continue to circulate and grow in an unstable loop leading to a phenomenon known as howling.

Figure 4:
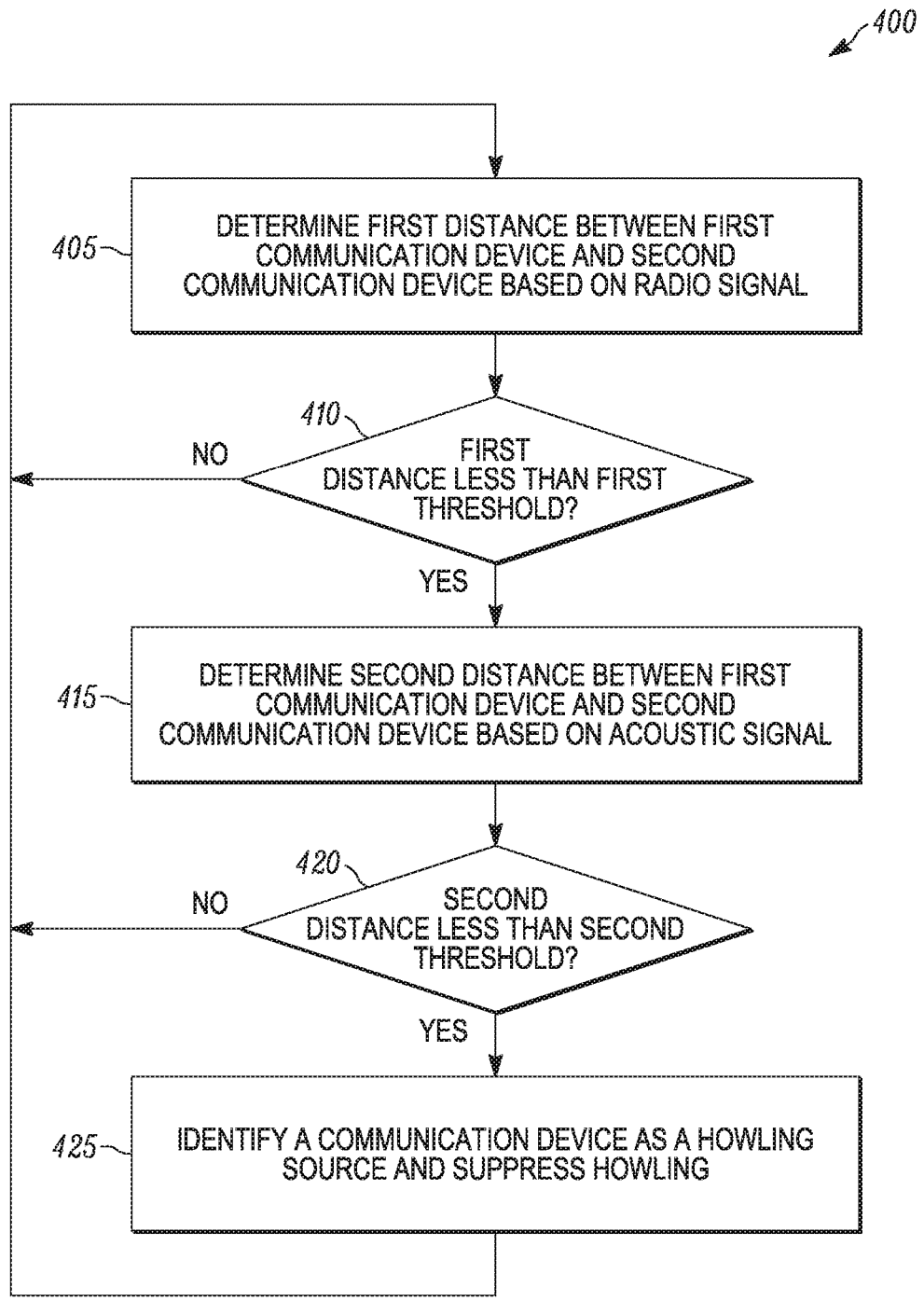
FIG. 4 is a flowchart of a method of identifying a howling source performed by the first communication device of FIG. 2 according to one embodiment.

Accordingly, to detect a howling situation, a communication device may perform a method 400 illustrated in FIG. 4. For example, the first communication device 105 may perform the method 400 to identify whether the second communication device 110 is a howling source (that is, an actual or current howling source or a potential howling source) based on the distance between the first communication device 105 and the second communication device 110. Alternatively or in addition, the first communication device 105 may perform the method 400 to identify whether it is a howling source (for example, when other communication devices, such as the second communication device 110, are transmitting data to the first communication device 105). Furthermore, as described in further detail below, the method 400 includes the first communication device 105, the second communication device 110, or a combination thereof taking one or more actions to suppress (for example, prevent, stop, or limit) howling when howling is occurring or could occur. It should be understood, however, that although the method 400 is described as being performed by the first communication device 105, the method 400 may be performed by the second communication device 110 or another device included in the communication system 100.

As illustrated in FIG. 4, the method 400 includes determining, with the first electronic processor 205 of the first communication device 105, a first distance between the first communication device 105 and the second communication device 110 based on a radio signal received by the first radio transceiver 235 (at block 405). For example, the second communication device 110 may transmit a radio signal with the second radio transceiver 335. As described above, in some embodiments, the second radio transceiver 335 may include a Bluetooth™ low energy transceiver that transmits radio signals having a range of approximately twenty meters to 120 meters, or any value therebetween. It should be understood that these ranges are merely exemplary and that, in some embodiments, the range of the second radio transceiver 335 may be greater than 120 meters or less than twenty meters. Accordingly, when the first communication device 105 receives the radio signal from the second communication device 110 through the first radio transceiver 235, the first electronic processor 205 processes the received signal to identify the first distance between the first communication device 105 and the second communication device 110.

For example, in some embodiments, when the first electronic processor 205 receives a radio signal transmitted by the second communication device 110, the first electronic processor 205 determines the first distance based on the signal strength of the received radio signal. In particular, as the radio signal travels, the strength of the signal decreases. Therefore, the first electronic processor 205 uses the signal strength of the received radio signal to determine how far the radio signal has traveled and, consequently, the first distance between the first communication device 105 and the second communication device 110. It should be understood that the first electronic processor 205 may use other methods to determine the first distance based on the radio signal. For example, the first electronic processor 205 may use data contained in the received radio signal, such as a time stamp, to identify a time of flight of the radio signal (that is, how long the radio signal traveled before reaching the first communication device 105). Similarly, in some embodiments, the first electronic processor 205 may use the receipt of the radio signal (as compared to the lack of receipt of a radio signal) to determine that the second communication device 110 is at least within a transmission range of the received radio signal. For example, in some embodiments, the transmission range may be approximately 100 meters. It should be understood that a transmission range of approximately 100 meters is merely exemplary and that the transmission range may be greater than or less than 100 meters in other embodiments.

As illustrated in FIG. 4, when the first distance is not less than a first threshold or when a radio signal is not received by the first communication device 105 for calculating the first distance (at block 410), the first electronic processor 205 continues to monitor for received radio signals and determines the first distance accordingly (at block 405). Accordingly, in this situation, the second communication device 110 is not identified as a howling source by the first communication device 105 because the second communication device 110 is not located close enough to the first communication device 105 to produce howling. In some embodiments, the first threshold is within a range of approximately ten to forty meters. It should be understood that this range of values corresponding to the first threshold is merely exemplary and that the first threshold may have a value outside of this range in some embodiments.

Alternatively, when the first distance is less than the first threshold (at block 410), the first electronic processor 205 determines a second distance between the first communication device 105 and the second communication device 110 based on an acoustic signal received by the first microphone 220 of the first communication device 105 (at block 415). For example, the first electronic processor 205 may output an initial acoustic signal, such as an ultrasonic signal, through the first speaker 225. When the second microphone 320 of the second communication device 110 receives the initial acoustic signal, the second electronic processor 305 of the second communication device 110 transmits a return acoustic signal, such as an ultrasonic signal, through the second speaker 325. In some embodiments, the return acoustic signal may be identical to the acoustic signal received from the first communication device 105. The first microphone 220 of the first communication device 105 receives the return acoustic signal, and the first electronic processor 205 uses the return acoustic signal to determine the second distance. For example, the first electronic processor 205 may use a time of receipt of the return acoustic signal to determine a time-of-flight of initial acoustic signal, the return acoustic signal, or both, which may be used to determine the second distance (that is, an acoustic distance between the first communication device 105 and the second communication device 110). Alternatively or in addition, the first electronic processor 205 may use data contained in the return acoustic signal (for example, a frequency, amplitude, phase, digital modulation, and the like) to identify time-of-flight information for the initial acoustic signal, the return acoustic signal, or both. Alternatively or in addition, the first electronic processor 205 may determine the second distance based on the signal strength of the return acoustic signal received by the first communication device 105 from the second communication device 110.

It should be understood that, in some embodiments, the radio signal transmitted by the second communication device 110 may specify a frequency or other method of identification for acoustic signals. Accordingly, when the first communication device 105 transmits the initial acoustic signal, the first communication device 105 may transmit the acoustic signal at the frequency specified in the radio signal, the second communication device 110 may transmit the return acoustic signal at the frequency specified in the radio signal, or both. Accordingly, the frequency of a received acoustic signal may identify whether the signal was intended for the second communication device 110 (as compared to another communication device included in the communication system 100), a source of the acoustic signal, or a combination thereof. For example, when the communication system 100 includes more than two communication devices, it may be difficult for the first communication device 105 to identify whether a returned acoustic signal corresponds to an initial acoustic signal transmitted by the first communication device 105 or to an acoustic signal transmitted by another communication device included in the communication system 100.

As illustrated in FIG. 4, when the second distance is not less than a second threshold (at block 420), the first electronic processor 205 may return to monitoring for received radio signals (at block 405). Accordingly, in this situation, the second communication device 110 may not be located close enough to the first communication device 105 to be a howling source. In other embodiments, the first electronic processor 205 may output another acoustic signal. The first electronic processor 205 may continue to output these acoustic signals a predetermined number of times or for a predetermined time, until the determined second distance exceeds the first threshold, or until the second distance starts to increase over time. In some embodiments, the second threshold is within a range of approximately four to ten meters. It should be understood that this range of values corresponding to the second threshold is merely exemplary and that the second threshold may have a value outside of this range in some embodiments.

Alternatively, when the second distance is less than the second threshold (at block 420), the first electronic processor 205 identifies the second communication device 110 as a howling source and takes one or more actions to suppress howling associated with the howling source (at block 425). For example, the first electronic processor 205 may modify operation of the first communication device 105, such as lowering a sensitivity of the first microphone 220, performing acoustic noise cancellation, performing feedback cancellation, performing howling cancellation, executing howling suppression algorithms, or a combination thereof. Alternatively or in addition, the first electronic processor 205 may output one or more instructions (for example, audible instructions, visual instructions, or a combination thereof to a user of the first communication device 105) for changing a location (for example, geographic location or physical orientation or position) of the first communication device 105, the second communication device 110, or the combination thereof to suppress howling (for example, moving further away from the second communication device 110). Alternatively or in addition, the first electronic processor 205 may modify operation of the second communication device 110 by transmitting a signal to the second communication device 110 or another device, such as a call controller or manager (for example, a server) for the communication system 100. For example, the transmitted signal may instruct the second communication device 110 to lower a volume of the second speaker 325 of the second communication device 110, perform acoustic noise cancellation, perform feedback cancellation, perform howling cancellation, execute howling suppression algorithms, or a combination thereof. It should be understood that the first electronic processor 205 may transmit such a signal using the first radio transceiver 235, the first network interface 215, or the combination thereof. Additionally, in some embodiments, the transmitted signal may include information relating to the distance between the first communication device 105 and the second communication device 110. When received by the second communication device 110, the second electronic processor 305 may determine whether to suppress howling and how to suppress howling based on the information relating to the distance between the first communication device 105 and the second communication device 110.

As illustrated in FIG. 4, the first communication device 105 may repeat the method 400 to periodically (for example, continuously) identify howling sources and take action to suppress howling. Also, in some embodiments, when the first communication device 105 identifies the second communication device 110 as a howling source, the first communication device 105 may monitor the distance between the first communication device 105 and the second communication device 110 to identify when howling suppression is no longer needed.

Accordingly, as described above, the first communication device 105 identifies a howling source using a two-step approach. In a first step, the first communication device 105 determines a first, coarse distance using a lower power detection technique (for example, Bluetooth™ low energy beacons). When the coarse distance is less than a first threshold, the first communication device 105 determines a second, finer distance (for example, using an acoustic signal) in a second step. Thus, the first communication device 105 uses the more power intensive detection technique for those communication devices initially detected within a first distance from the first communication device 105. For example, in some embodiments, the first distance is set to a distance from the first communication device 105 at which acoustic signals, such as ultrasonic signals, may be coherently transmitted and received. Thus, the two-step approach accurately and energy efficiently detects a howling source. Furthermore, the first communication device 105 may perform the two-step approach even before howling occurs (for example, before the first communication device 105 communicates with the second communication device 110 through the network 120). Accordingly, the two-step approach may identify a potential howling source before howling occurs, which allows the first communication device 105 to take actions to prevent howling from occurring.

For example, FIGS. 5A through 5D illustrate example locations of the second communication device 110 with respect to the first communication device 105. As illustrated in FIGS. 5A through 5D, the first communication device 105 has a first range 500 for receiving radio signals, a second range 502 for receiving acoustic signals, and a third range 504 for experiencing howling. In some embodiments, the second range 502 represents the first threshold described above with respect to the method 400 and the third range 504 represents the second threshold described above with respect to the method 400. It should be understood that the ranges 500, 502, and 504 illustrated in FIGS. 5A through 5D are example ranges and the ranges 500, 502, and 504 may have different sizes and shapes than as illustrated in FIGS. 5A through 5D. For example, in some embodiments, one or more of the ranges 500, 502, and 504 may have a non-uniform shape.

Figure 5A:
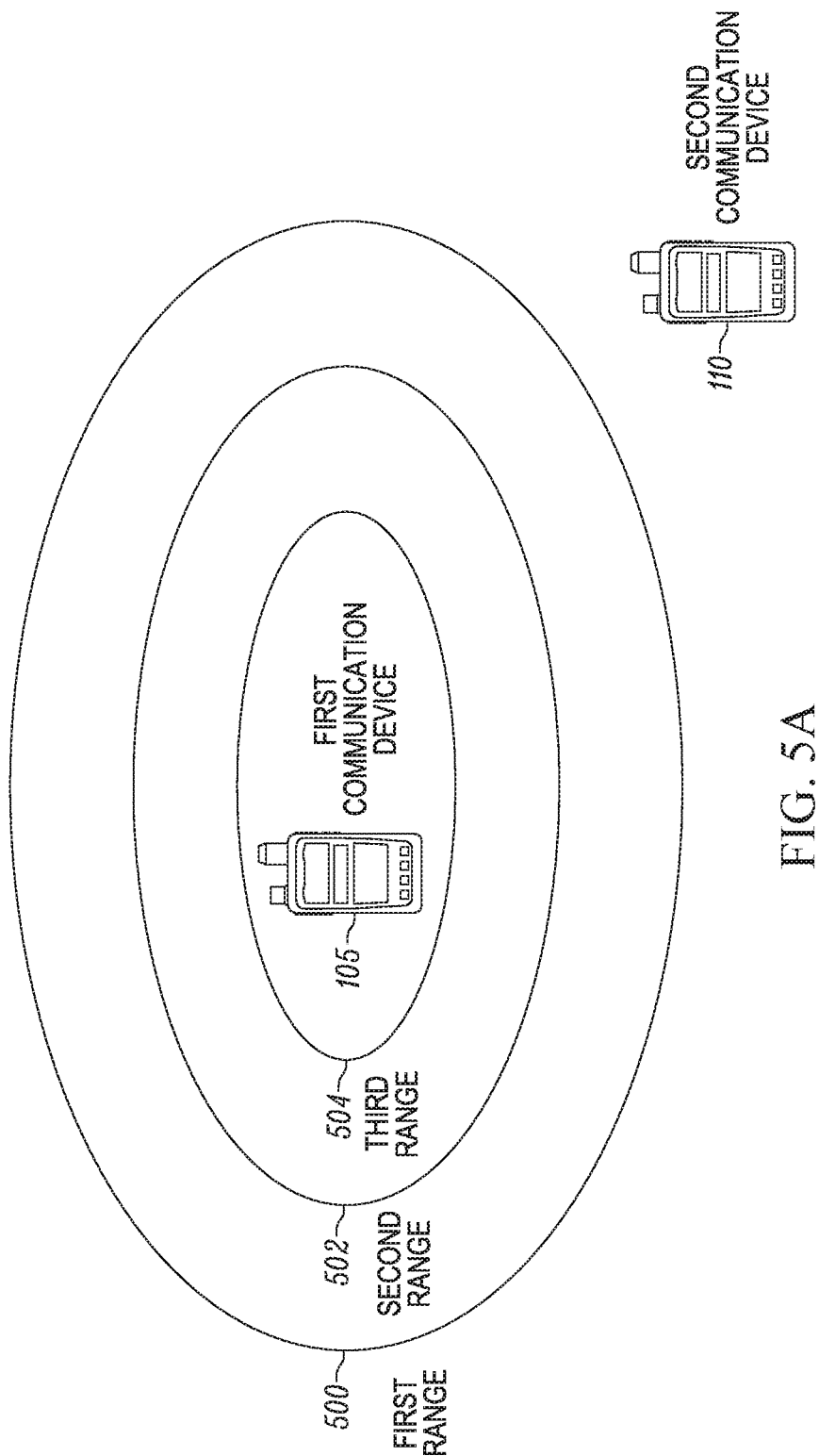
FIGS. 5A through 5D are block diagrams illustrating locations of the second communication device of FIG. 3 with respect to the first communication device of FIG. 2.

In the situation illustrated in FIG. 5A, the second communication device 110 is located outside of the first range 500. Accordingly, in this situation, a radio signal transmitted by the second radio transceiver 335 is not received by the first communication device 105. Hence, in this situation, the first communication device 105 does not identify the second communication device 110 as a howling source. Furthermore, in this situation, the first communication device 105 does not attempt to identify a distance between the first communication device 105 and the second communication device 110 using acoustic signals.

Figure 5B:
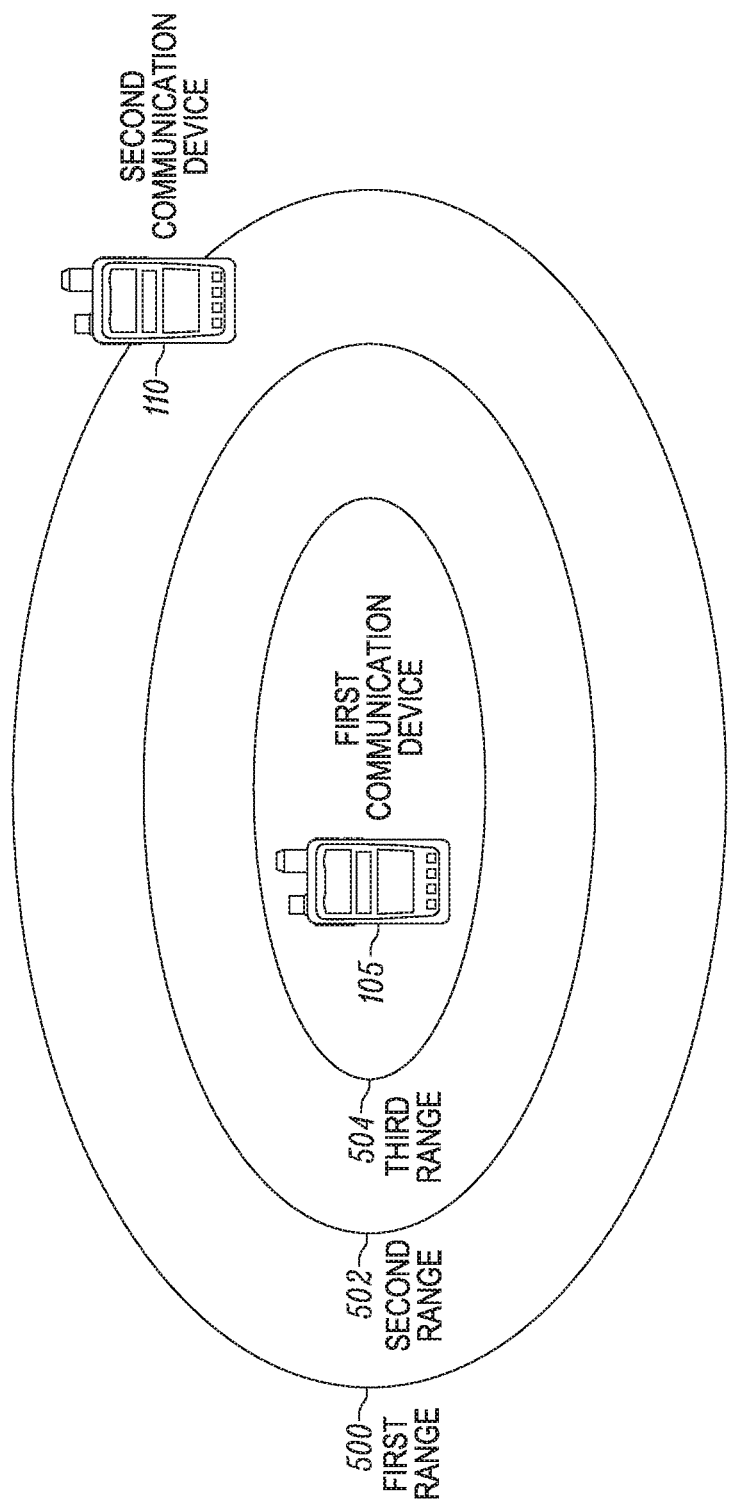

In the situation illustrated in FIG. 5B, the second communication device 110 is located inside the first range 500 but outside the second range 502. Accordingly, in this situation, a radio signal transmitted by the second radio transceiver 335 is received by the first communication device 105. However, because the second communication device 110 is outside of the second range 502 (that is, corresponding to the first threshold), the first communication device 105 does not identify the second communication device 110 as a howling source. Furthermore, in this situation, the first communication device 105 does not attempt to identify a distance between the first communication device 105 and the second communication device 110 using acoustic signals.

Figure 5C:
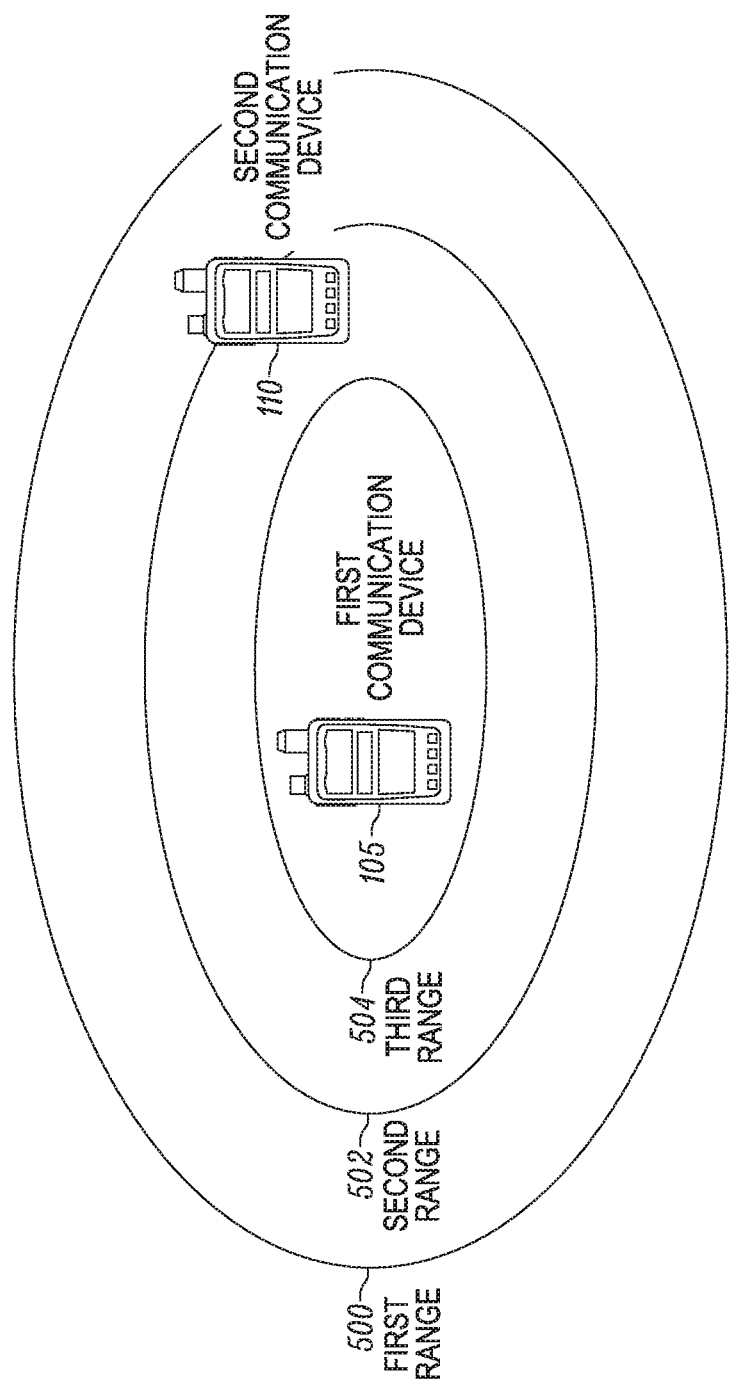

In the situation illustrated in FIG. 5C, the second communication device 110 is located inside the first range 500, inside the second range 502, but outside the third range 504. Accordingly, in this situation, a radio signal transmitted by the second radio transceiver 335 is received by the first communication device 105. Furthermore, in this situation, because the second communication device 110 is inside of the second range 502 (that is, corresponding to the first threshold), the first communication device 105 determines a distance between the first communication device 105 and the second communication device 110 using acoustic signals. However, because the second communication device 110 is located outside of the third range 504 (that is, corresponding to the second threshold), the first communication device 105 does not identify the second communication device 110 as a howling source.

Figure 5D:
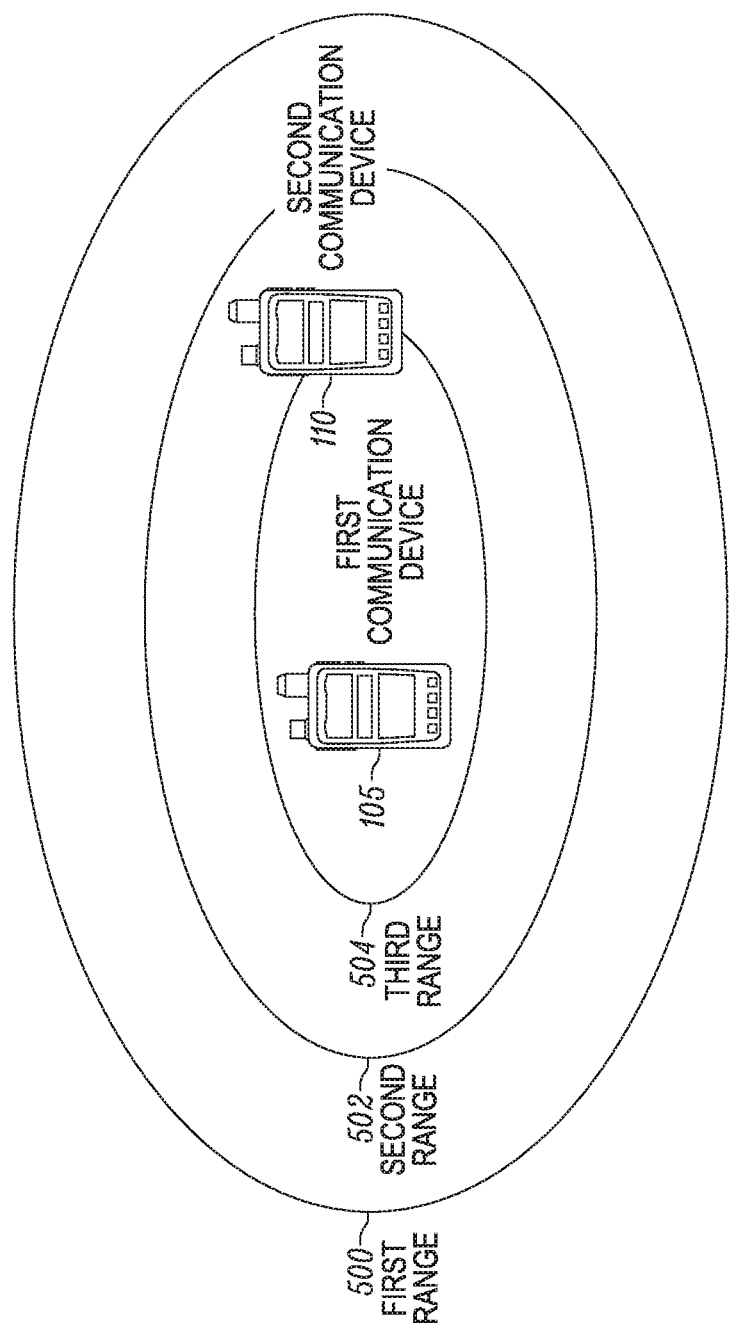

In the situation illustrated in FIG. 5D, the second communication device 110 is located inside the first range 500, inside the second range 502, and inside the third range 504. Accordingly, in this situation, a radio signal transmitted by the second radio transceiver 335 is received by the first communication device 105. Furthermore, in this situation, because the second communication device 110 is inside of the second range 502 (that is, corresponding to the first threshold), the first communication device 105 determines a distance between the first communication device 105 and the second communication device 110 using acoustic signals. In addition, because the second communication device 110 is located inside of the third range 504 (that is, corresponding to the second threshold), the first communication device 105 identifies the second communication device 110 as a howling source and takes one or more action to suppress howling associated with the second communication device 110.

Accordingly, as illustrated in FIGS. 5A through 5D, the radio proximity detection technique is used to control when the acoustic proximity detection technique is used to conserve power consumption of the first communication device 105. Other techniques may also be used to control when the acoustic proximity detection technique is used and, consequently, to conserve power consumption. For example, as noted above, howling may occur when the first communication device 105 is communicating with the second communication device 110. Accordingly, the first electronic processor 205 may perform the acoustic proximity detection technique when the radio proximity detection technique has detected the second communication device 110 and the first communication device 105 is communicating over the network 120. For example, the first electronic processor 205 may determine when the first push-to-talk selection mechanism 240 is enabled and may perform the acoustic proximity detection technique when the radio proximity detection technique has detected the second communication device 110 and when the first push-to-talk selection mechanism 240 is enabled. Furthermore, the first electronic processor 205 may use a status of the first network interface 215 to identify when the first communication device 105 is communicating over the network 120. Similarly, the first electronic processor 205 may perform the acoustic proximity detection technique when the radio proximity detection technique has detected the second communication device 110 and the first communication device 105 is initiating a communication over the network 120 (for example, a user of the first communication device 105 is entering or selecting a telephone number). It should also be understood that, in some embodiments, the first electronic processor 205 may perform both the radio proximity detection technique and the acoustic proximity detection technique only when the first communication device 105 is communicating over the network 120. Furthermore, in some embodiments, the first electronic processor 205 may determine a current operating status of the first communication device 105 (for example, battery status, speaker volume, background noise, mounting configuration, and the like) and may determine when to perform the acoustic proximity detection technique based on the current operating status. For example, in some embodiments, when the battery status of the first communication device 105 is below a predetermined level, the first electronic processor 205 may not perform the acoustic proximity detection technique even when the second distance is less than the second threshold.

It should be understood that first communication device 105 may take other factors into account when identifying whether the second communication device 110 is a howling source and when taking actions to suppress howling. For example, the first electronic processor 205 may determine a probability of howling occurring before identifying the second communication device 110 as a howling source. The probability may be based on the distance between the first communication device 105 and the second communication device 110. This distance may be the first distance determined by the first electronic processor 205, the second distance determined by the first electronic processor 205, or a combination thereof (for example, an average). In some embodiments, the smaller this distance, the higher the probability of howling.

Current operating parameters of the first communication device 105 may also be used to determine a probability or to determine whether to identify the second communication device 110 as a howling source and what actions to take to suppress howling. For example, current operating status of the first communication device 105, such as battery status, speaker volume, background noise, mounting configuration, and the like may impact whether the second communication device 110 should be identified as a howling source and what actions should be taken by the first communication device 105 to suppress the howling.

Similarly, identification data of the first communication device 105 may impact the probability. For example, in some situations, certain types or models of communication devices may be more susceptible to howling than other types or models of communication devices (for example, number of microphones, operating parameters of a microphone, placement or configuration of a microphone, number of speakers, operating parameters of a speaker, placement or configuration of a speaker, and the like). Accordingly, the first electronic processor 205 may take this information into account when determining the probability.

In some embodiments, the first communication device 105 may receive a current operating status, identification data, or both from the second communication device 110 (for example, through a radio signal or an acoustic signal or through the network 120), which the first electronic processor 205 may use determine the probability or whether to identify the second communication device 110 as a howling source and what actions to take in response.

Accordingly, the first communication device 105 may be configured to determine a probability based on the distance and compare the probability to a predetermined threshold to determine whether to identify the second communication device 110 as a howling source and take actions in response. In some embodiments, this threshold may be configurable by a user of the first communication device 105 or may be based on a current operating status of the first communication device 105 (for example, battery status, speaker volume, background noise, mounting configuration, and the like). The first and second thresholds described above may similarly be configurable by a user to be based on a current operating status of the first communication device 105. For example, in some embodiments, the second threshold may decrease as the battery status of the first communication device 105 decreases.

The first communication device 105 may also use the probability to identify what action to take to suppress the howling. For example, the larger the probability, the lower the first communication device 105 may set the sensitivity of first microphone 220.

Similarly, the action taken by the first communication device 105 to suppress howling may depend on a similar probability. For example, in some embodiments, the first communication device 105 transmits the probability or data used to determine such a probability (for example, distance, current operating status, identification data, and the like) as described above to the second communication device 110 (for example, using the first radio transceiver 235). The second communication device 110 may then adjust its operation based on the received distance. For example, the smaller the distance between the first communication device 105 and the second communication device 110, the more the second communication device 110 may reduce the volume of the second speaker 325.

Accordingly, embodiments of the invention provide methods and systems for identifying a howling source using a two-step process. It should be understood that additional steps may be included to further identify a howling source. For example, in some embodiments, a third proximity detection technique may be used to further conserve power consumption, provide a more accurate determination of distance, or a combination thereof. Also, it should be should be understood that a communication device may identify multiple howling sources and may take one or more actions to suppress howling associated with one or more of the identified howling sources.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A first communication device comprising:
   a microphone;
   a radio transceiver; and
   an electronic processor,
   the electronic processor configured to
      determine a first distance between the first communication device and a second communication device based on a radio signal received by the radio transceiver,
      determine whether the first distance is less than a first threshold,
      when the first distance is less than the first threshold, determine a second distance between the first communication device and the second communication device based on an acoustic signal received by the microphone, and
      when the second distance is less than a second threshold, identify one selected from the group consisting of the first communication device and the second communication device as a howling source and suppress howling associated with the howling source.

2. The first communication device of claim 1, wherein the radio signal includes a low-power, short-distance radio signal.

3. The first communication device of claim 1, wherein the radio signal is transmitted by the second communication device.

4. The first communication device of claim 1, wherein the electronic processor determines the first distance based on a signal strength of the radio signal.

5. The first communication device of claim 1, wherein the electronic processor determines the second distance based on the radio signal and the acoustic signal.

6. The first communication device of claim 1, wherein the acoustic signal includes an ultrasonic signal.

7. The first communication device of claim 1, further comprising a speaker, and wherein the electronic processor determines the second distance by transmitting a second acoustic signal using the speaker, receiving the first acoustic signal from the second communication device through the microphone, and determining the second distance based on a time-of-flight of at least one selected from a group consisting of the first acoustic signal and the second acoustic signal.

8. The first communication device of claim 1, wherein the first communication device further includes a push-to-talk selection mechanism and wherein the electronic processor determines when the push-to-talk selection mechanism is enabled and determines the second distance when the first distance is less than the first threshold and when the push-to-talk selection mechanism is enabled.

9. The first communication device of claim 1, wherein the electronic processor suppresses howling by performing at least one selected from a group consisting of transmitting a signal to the second communication device to lower a speaker volume of the second communication device, lowering a microphone sensitivity of the first communication device, performing noise cancellation, and outputting an instruction to change a location of at least one selected from the group consisting of the first communication device and the second communication device.

10. A method of identifying a howling source and suppressing howling, the method comprising:
   determining, with an electronic processor of a first communication device, a first distance between the first communication device and a second communication device based on a radio signal received by a radio transceiver of the first communication device;
   determining, with the electronic processor of the first communication device, whether the first distance is less than a first threshold;
   when the first distance is less than the first threshold, determining, with the electronic processor of the first communication device, a second distance between the first communication device and the second communication device based on an acoustic signal received by a microphone of the first communication device; and when the second distance is less than a second threshold, identifying, with the electronic processor of the first communication device, the second communication device as the howling source for the first communication device, and suppressing howling associated with the second communication device.

11. The method of claim 10, wherein receiving the radio signal includes receiving a low-power, short-distance radio signal.

12. The method of claim 10, further comprising transmitting, with the second communication device, the radio signal.

13. The method of claim 10, wherein determining the first distance includes determining the first distance based on a signal strength of the radio signal.

14. The method of claim 10, wherein determining the second distance includes determining the second distance based on the radio signal and the acoustic signal.

15. The method of claim 10, wherein receiving the acoustic signal includes receiving an ultrasonic signal.

16. The method of claim 10, further comprising transmitting, with a speaker of the first communication device, a second acoustic signal, and wherein determining the second distance includes determining, with the electronic processor, the second distance based on a signal strength of at least one selected from a group consisting of the first acoustic signal and the second acoustic signal.

17. The method of claim 10, further comprising determining, with the electronic processor, when a push-to-talk selection mechanism included in the first communication device is enabled, and wherein determining the second distance includes determining the second distance when the first distance is less than the first threshold and when the push-to-talk selection mechanism is enabled.

18. The method of claim 10, wherein suppressing howling associated with the second communication device includes at least one selected from a group consisting of transmitting a signal to the second communication device to lower a speaker volume of the second communication device, lowering a microphone sensitivity of the first communication device, and performing noise cancellation, and outputting instructions for changing a location of at least one selected from the group consisting of the first communication device and the second communication device.

19. A communication system comprising
a first communication device including a microphone, a first transceiver, and an electronic processor; and
a second communication device including a second transceiver transmitting a radio signal and a speaker transmitting an acoustic signal, wherein
the electronic processor determines a first distance between the first communication device and the second communication device based on the radio signal received by the first transceiver,
the electronic processor determines whether the first distance is less than a first threshold,
when the first distance is less than the first threshold, the electronic processor determines a second distance between the first communication device and the second communication device based on the acoustic signal received by the microphone; and
when the second distance is less than a second threshold, the electronic processor instructs at least one selected from the group consisting of the first communication device and the second communication device to suppress howling.

20. A method of identifying a howling source and suppressing howling, the method comprising:
determining, with an electronic processor, a coarse distance between a first communication device and a second communication device using a low power radio proximity detection technique;
determining whether the coarse distance is less than a first threshold;
when the coarse distance is less than the first threshold, determining, with the electronic processor, a finer distance between the first communication device and the second communication device using a higher power acoustic proximity detection technique; and
when the finer distance is less than a second threshold, identifying, with the electronic processor, one selected from the group consisting of the first communication device and the second communication device as a howling source and suppressing howling associated with the howling source.

* * * * *